(12) United States Patent
Xu et al.

(10) Patent No.: US 10,030,160 B2
(45) Date of Patent: Jul. 24, 2018

(54) PIGMENT COMPOSITES COMPRISING SYNERGISTS AND POLYMER COATINGS

(71) Applicant: Cabot Corporation, Boston, MA (US)

(72) Inventors: Jinqi Xu, Westford, MA (US); Alexander I. Shakhnovich, Arlington, MA (US)

(73) Assignee: Cabot Corporation, Boston, MA (US)

( * ) Notice: Subject to any disclaimer, the term of this patent is extended or adjusted under 35 U.S.C. 154(b) by 0 days.

(21) Appl. No.: 15/104,355

(22) PCT Filed: Dec. 16, 2014

(86) PCT No.: PCT/US2014/070457
§ 371 (c)(1),
(2) Date: Jun. 14, 2016

(87) PCT Pub. No.: WO2015/095105
PCT Pub. Date: Jun. 25, 2015

(65) Prior Publication Data
US 2016/0312054 A1    Oct. 27, 2016

Related U.S. Application Data

(60) Provisional application No. 61/916,859, filed on Dec. 17, 2013, provisional application No. 62/005,149, filed on May 30, 2014, provisional application No. 62/012,541, filed on Jun. 16, 2014.

(51) Int. Cl.
| | |
|---|---|
| C09D 5/02 | (2006.01) |
| C09D 11/38 | (2014.01) |
| C09C 3/06 | (2006.01) |
| C09C 3/08 | (2006.01) |
| C09C 3/10 | (2006.01) |
| C09D 11/322 | (2014.01) |
| C09D 11/326 | (2014.01) |
| C09D 11/107 | (2014.01) |
| C09B 67/22 | (2006.01) |
| C09B 67/46 | (2006.01) |

(52) U.S. Cl.
CPC ............ *C09D 11/38* (2013.01); *C09B 67/009* (2013.01); *C09B 67/0033* (2013.01); *C09B 67/0034* (2013.01); *C09B 67/0035* (2013.01); *C09B 67/0051* (2013.01); *C09C 3/063* (2013.01); *C09C 3/08* (2013.01); *C09C 3/10* (2013.01); *C09D 11/107* (2013.01); *C09D 11/322* (2013.01); *C09D 11/326* (2013.01); *C01P 2004/62* (2013.01); *C01P 2004/64* (2013.01); *C01P 2006/22* (2013.01)

(58) Field of Classification Search
CPC ...... C09D 11/38; C09D 11/322; C09D 11/107
USPC ............................................... 524/556
See application file for complete search history.

(56) References Cited

U.S. PATENT DOCUMENTS

| | | | |
|---|---|---|---|
| 4,350,534 A | 9/1982 | Fechner et al. | |
| 5,728,204 A | 3/1998 | Sattar et al. | |
| 6,221,143 B1 | 4/2001 | Palumbo | |
| 7,223,302 B2 | 5/2007 | Shakhnovich | |
| 7,300,504 B2 | 11/2007 | Shakhnovich | |
| 7,423,076 B2 | 9/2008 | Miyabayashi | |
| 7,651,557 B2* | 1/2010 | Burns .................. | C09D 11/322 106/31.6 |
| 7,780,774 B2 | 8/2010 | Wong et al. | |
| 7,901,503 B2 | 3/2011 | Vilner | |
| 8,048,213 B2 | 11/2011 | Shakhnovich | |
| 8,133,311 B2 | 3/2012 | Burns et al. | |
| 9,133,356 B2 | 9/2015 | Yoshida et al. | |
| 2002/0061947 A1 | 5/2002 | Cooke et al. | |
| 2003/0205171 A1* | 11/2003 | Adams ..................... | C09C 1/48 106/476 |
| 2009/0239981 A1 | 9/2009 | Morimoto | |

FOREIGN PATENT DOCUMENTS

| | | |
|---|---|---|
| DE | 10 2007033192 A1 | 1/2009 |
| JP | 1994(H06)-345997 | 12/1994 |
| JP | 1997(H09)-176511 | 7/1997 |
| JP | 2002-285028 A | 10/2002 |

OTHER PUBLICATIONS

The International Search Report and The Written Opinion of the International Searching Authority, or the Declaration of International Patent Application No. PCT/US2014/070457, dated Aug. 3, 2015.

* cited by examiner

*Primary Examiner* — Hui Chin

(57) ABSTRACT

Disclosed herein are composite particles comprising: a pigment; at least one ionic synergist adsorbed to the pigment surface; and at least one ionic polymer coating the pigment surface comprising the at least one synergist, wherein the at least one synergist and the at least one polymer have opposing charges, and wherein in the composite, a total charge of the at least one polymer is greater than a total charge of the at least one synergist. Also disclosed are dispersions and inkjet ink compositions comprising composite particles.

20 Claims, No Drawings

PIGMENT COMPOSITES COMPRISING SYNERGISTS AND POLYMER COATINGS

RELATED APPLICATION

This application is a national phase application of PCT/US2014/070457, filed Dec. 16, 2014, which claims priority under 35 U.S.C. § 119(e) to U.S. Prov. App. No. 61/916,859, filed Dec. 17, 2013, U.S. Prov. App. No. 62/005,149, filed May 30, 2014, and U.S. Prov. App. No. 62/012,541, filed Jun. 16, 2014, the disclosures of which are incorporated herein by reference.

FIELD OF THE INVENTION

Disclosed herein are self-dispersible pigment composites, and dispersions and inkjet ink compositions comprising such composites.

BACKGROUND

Generally, pigments are not readily dispersible in water and most solvents. There has been much effort in developing dispersant systems to provide stable pigment dispersions to render pigments useful for applications such as inkjet printing, including the addition of external dispersing agents or modification of the pigment to render them self-dispersible. However, with the growing use and variety of applications requiring such pigments, e.g., high speed printing, printing on a variety of substrates, there remains a need to develop new compositions for stable pigment dispersions.

SUMMARY

One embodiment provides composite particles comprising:
a pigment;
at least one ionic synergist adsorbed to the pigment surface; and at least one ionic polymer coating the pigment surface comprising the at least
one synergist,
wherein the at least one synergist and the at least one polymer have opposing charges, and
wherein in the composite, a total charge of the at least one polymer is greater than a total charge of the at least one synergist.

Another embodiment provides a method of making composite particles comprising:
combining a pigment with at least one ionic synergist adsorbed to the pigment surface;
coating the pigment surface comprising the at least one synergist with at least one ionic polymer,
wherein the at least one synergist and the at least one polymer have opposing charges, and
wherein in the composite, a total charge of the at least one polymer is greater than a total charge of the at least one synergist.

Another embodiment provides a dispersion comprising:
a copper phthalocyanine pigment; and
a modified copper phthalocyanine additive present in an amount of at least 3% by weight, relative to the total weight of the pigment, the additive being capable of dispersing the pigment,
wherein the modified copper phthalocyanine additive comprises at least one substituent selected from $-[SO_3]^- X^+$, $-[CO_2]^- X^+$, $-[CH_2NR^1R^2R^3]^+Y^-$, $-[CH_2NH(CH_2)_n NR^1R^2R^3]^+Y^-$, and $-[SO_2NH(CH_2)_n NR^1R^2R^3]^+T$, and wherein $X^+$ is selected from hydrogen, alkali metal, ammonium, and alkylammonium; n=1–6; $R^1$, $R^2$, and $R^3$ are independently selected from hydrogen, alkyls, and $C_5$-$C_6$ cycloalkyls; and Y is independently selected from chloride, bromide, sulfate, hydrosulfate, acetate, propionate, and $C_1$-$C_6$ alkylsulfonate.

DETAILED DESCRIPTION

Disclosed herein are pigment composites, in which a pigment has adsorbed on its surface at least one synergist and further coated with a polymer. Accordingly, one embodiment provides composite particles comprising:
a pigment;
at least one ionic synergist adsorbed to the pigment surface; and
at least one ionic polymer coating the pigment surface comprising the at least one synergist,
wherein the at least one synergist and the at least one polymer have opposing charges, and
wherein in the composite, a total charge of the at least one polymer is greater than a total charge of the at least one synergist.

In one embodiment, the pigment is an organic pigment, e.g., an organic colored pigment. Typically, an organic colored pigment comprises an organic chromophore group that may be further substituted with one or more substituents. Generally, the organic chromophore group provides the essential color of the pigment. In one embodiment, the one or more substituents (e.g., a functional group) bonded to the chromophore further defines the specific color and hue of the pigment and differentiates it from other pigments in the same pigment class. In one embodiment, the organic chromophore group is that portion of the colorant structure to which the substituents are bonded and may be considered the backbone or skeleton structure of the pigment.

In one embodiment, the synergist is structurally similar to the pigment. In one embodiment, a "structurally similar" synergist contains an identical structural section and a distinct structural section. In one embodiment, the identical structural section comprises at least 50% of the total molecular weight of the pigment, e.g., at least 60%, at least 70%, at least 75%, at least 80%, at least 85%, at least 90%, at least 95%, or at least 99% of the total molecular weight of the pigment. In one embodiment, providing a synergist having at least one or more components that is structurally similar to the pigment results in improved dispersion stability. In one embodiment, the synergist is a derivative of the pigment. In one embodiment, the synergist is structurally similar to the chromophore of the pigment, e.g., a derivative of the chromophore. For example, the synergist can be a dye. In one embodiment, both the pigment and the synergist are derivatives of the chromophore.

In one embodiment, the synergist is a dispersant, e.g., a material separate from the pigment that is capable of providing a stable dispersion of the pigment in a liquid medium. The synergist is therefore not a material produced during the preparation of the pigment using, for example, known mixed coupling techniques. In one embodiment, the synergist is soluble in a liquid medium, e.g., an aqueous solution.

The inkjet ink composition can also comprise more than one pigment and more than one synergist. However, the structural relationships discussed above must also apply to these blends. For example, if the inkjet ink composition comprises two pigments, the inkjet ink composition also comprises at least two synergists, at least one synergist having a component that is the same (or structurally similar)

to that of the first pigment and at least one synergist having a component that is the same (or structurally similar) to that of the second pigment. If a combination of two pigments are used that have the same component, than only one synergist is needed, which should also have the same component. Also, more than one synergist can be used for a one pigment, as long as the components of each synergist are the same as the component of the pigment. Other combinations and blends of pigments and synergists are also possible, meeting the structural relations provided above.

In one embodiment, the synergist is adsorbed to the pigment surface to the extent that it remains adsorbed even upon aging, e.g., for at least 7 days. In one embodiment, the dispersion maintains the synergist adsorbed to the pigment surface upon aging the dispersion for at least 7 days at 60° C.

Without wishing to be bound by any theory, the structural similarity between the pigment and synergist results in the synergist having a high affinity for the pigment. In one embodiment, the high affinity aids in the adsorption of the synergist to the pigment surface. In one embodiment, this high affinity can take the form of Van der Waals interactions (e.g., dipole-dipole interactions). In one embodiment, the synergist further comprises at least one ionic group, allowing further interactions between the pigment and synergist, including one or more of ionic interactions/bonding, hydrogen bonding, and acid/base interactions/reactions. In one embodiment, both the pigment and synergist have at least one ionic group, thereby providing interactions as described herein (e.g., Van der Waals interactions, ionic interactions/bonding, acid/base interactions/bonding, and hydrogen bonding).

Both the synergist and polymer are ionic as they contain ionic groups. "Ionic" can be either anionic or cationic and can be associated with a counterion of the opposite charge including inorganic or organic counterions, such as $Na^+$, $K^+$, $Li^+$, $NH_4^+$, $NR'_4^+$, acetate, $NO_3^-$, $SO_4^{2-}$, $R'SO_3^-$, $R'OSO_3^-$, $OH^-$, or $Cl^-$, where R' represents hydrogen or an organic group, such as a substituted or unsubstituted aryl or alkyl group. In one embodiment, an "ionic group" can also refer to an ionizable group, is one that is capable of forming an ionic group (e.g., salt) in the medium of use, e.g., a liquid vehicle. The ionic group can comprise ionic groups (e.g., anionic or cationic) mixed with the respective ionizable groups. Anionic groups are negatively charged ionic groups that can be generated from groups having ionizable substituents that can form anions (anionizable groups), such as acidic substituents. Cationic groups are positively charged organic ionic groups that can be generated from ionizable substituents that can form cations (cationizable groups), such as protonated amines.

In one embodiment, at least during and after the pigment surface is coated with the polymer, the ionic groups of both the synergist and the polymer are present in salt form. In one embodiment, the ionic groups of the ionic synergist and ionic polymer have opposing charges, allowing the polymer and ionic synergist to interact in one or more ways including ionic interactions/bonding, Van der Waals interactions, acid/base interactions/bonding, and hydrogen bonding. In one embodiment, the ionic synergist and the ionic polymer comprises at least one ionic group selected from salts of carboxylic acids, sulfonic acids, phosphonic acids, hydroxyls, and amines, so long as the selection results in the synergist and polymer to have opposing charges in the composite.

Specific examples of anionic groups include $—COO^-$, $—SO_3^-$, $—OSO_3^-$, $—HPO_3^-$; $—OPO_3^{2-}$, or $—PO_3^{2-}$, and specific examples of anionizable groups include $—COOH$, $—SO_3H$, $—PO_3H_2$, $—R'SH$, or $—R'OH$, where R' represents hydrogen or an organic group, such as a substituted or unsubstituted aryl or alkyl group. Also, specific examples of cationic or cationizable groups include alkyl or aryl amines (primary, secondary, and/or tertiary), which can be protonated in acidic media to form ammonium groups $—NR'_3^+$, where R' is selected from H and organic groups, such as a substituted or unsubstituted aryl (e.g., $C_5$-$C_{20}$ aryl groups such as phenyl, naphthyl) or alkyl groups (e.g., $C_1$-$C_{12}$ alkyl groups). Other cationic groups include pyridinium groups, quaternary ammonium groups, sulfonium groups ($—SR'_2^+$), phosphonium groups ($—PR'_3^+$), and corresponding cationizable groups. Quaternized cyclic amines, quaternized aromatic amines, and N-substituted pyridinium compounds, such as N-methyl-pyridyl, can also be used as the cationic group.

Exemplary counterions for cationic groups are disclosed in U.S. Pat. No. 6,221,143, the disclosure of which is incorporated herein by reference. Other organic ionic groups include those described in U.S. Pat. No. 5,698,016, the disclosure of which is incorporated herein by reference.

Exemplary pigment/synergist combinations include those described in U.S. Pat. Nos. 7,223,302, 8,048,213, and 8,133,311, the disclosures of which are incorporated herein by reference. In one embodiment, both the pigment and the synergist are azo compounds (e.g., monoazo, diazo). In one embodiment, the azo compounds further comprise at least one group selected from acetoacetamides, hydroxypyridones, pyrazolones, hydroxynaphthalenes. In one embodiment, these azo compounds further comprise at least one aromatic group optionally substituted with at least one ionic group (salt) or ionizable group and mixtures thereof, as disclosed herein. In one embodiment, both the pigment and the synergist comprise a group selected from quinolonoquinolonyls, quinacridonyls, quinacridonylenes, and phthalocyanines. In yet another embodiment, the pigment comprises a compound having the formula:

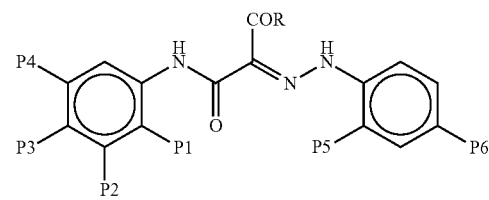

wherein P1-P6 are substituent groups of the azo pigment, and wherein P1 and P5 are not an alkoxy group; and the synergist has the formula

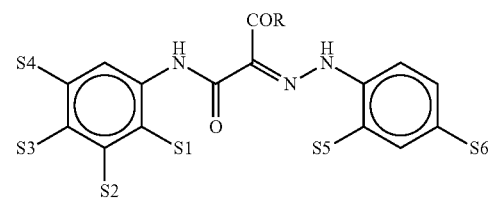

wherein S1-S6 are substituent groups of the synergist, at least one of S2-S4 comprises an ionic or ionizable group, S5=P5, and S6=P6. In one embodiment, for both the colorant and the synergist, R is a $C_1$-$C_6$ alkyl, e.g., methyl.

Another embodiment provides a dispersion comprising a copper phthalocyanine pigment and a modified copper phthalocyanine additive, which is a synergist. In one embodiment, the modified copper phthalocyanine additive is present in an amount of at least 3% by weight, relative to the total weight of the pigment, the additive being capable of dispersing the pigment. In one embodiment, the modified copper phthalocyanine additive is present in an amount ranging from 3% to 8% by weight, relative to the total weight of the pigment, e.g., an amount ranging from 3% to 7%, from 3% to 6%, or from 3% to 5% by weight, relative to the total weight of the pigment. In one embodiment, the modified copper phthalocyaninine additive is modified via substitution of a phthalocyanine ring.

The additive comprises at least one substituent, which can be anionic or cationic. In one embodiment, the at least one substituent is cationic and comprises ammonium ions having formulae such as $-[CH_2NR^1R^2R^3]^+Y^-$, $-[CH_2NH(CH_2)_nNR^1R^2R^3]^+Y^-$, and $-[SO_2NH(CH_2)_nNR^1R^2R^3]^+Y^-$, in which $R^1$, $R^2$, and $R^3$ are independently selected from hydrogen, alkyls, and $C_5$-$C_6$ cycloalkyls. In one embodiment, the alkyls are selected from $C_1$-$C_{12}$ alkyls, e.g., $C_1$-$C_6$ alkyls. In one embodiment, $R^1$, $R^2$, and $R^3$ are independently selected from $C_1$-$C_{12}$ alkyls, e.g., $C_1$-$C_6$ alkyls. In one embodiment, the anionic counterion, $Y^-$, is independently selected from chloride, bromide, sulfate, hydrosulfate, acetate, propionate, and $C_1$-$C_6$ alkylsulfonate. In one embodiment, the at least one substituent is anionic and is selected from $-[SO_3]^-X^+$, $-[CO_2]^-X^+$, where the counterion, $X^+$, is selected from hydrogen, alkali metal (e.g., $Na^+$, $K^+$) ammonium, and alkylammonium. In one embodiment, "alkylammonium" can be selected from mono-, di-, tri-, and tetralkylammonium, where each alkyl can be selected from $C_1$-$C_6$ alkyls.

Another embodiment provides a dispersion comprising, consisting essentially of, or consisting of:
water;
a copper phthalocyanine pigment; and
a modified copper phthalocyanine additive present in an amount of at least 3% by weight relative to the total weight of the pigment, the additive being capable of dispersing the pigment,
wherein the modified copper phthalocyanine additive comprises at least one substituent selected from $-[SO_3]^-X^+$, $-[CO_2]^-X^+$, $-[CH_2NR^1R^2R^3]^+Y^-$, $-[CH_2NH(CH_2)_nNR^1R^2R^3]^+Y^-$, and $-[SO_2NH(CH_2)_nNR^1R^2R^3]^+Y^-$, and
wherein $X^+$ is selected from hydrogen, alkali metal, ammonium, and alkylammonium; n=1-6; $R^1$, $R^2$, and $R^3$ are independently selected from hydrogen, alkyls, and $C_5$-$C_6$ cycloalkyls; and Y is independently selected from chloride, bromide, sulfate, hydrosulfate, acetate, propionate, and $C_1$-$C_6$ alkylsulfonate.

In one embodiment, the modified copper phthalocyanine additive comprises 1-4 substituents, e.g., 1-3 substituents, or 1-2 substituents. In another embodiment, the modified copper phthalocyanine additive comprises one substituent.

In one embodiment, the modified copper phthalocyanine additive is selected from Direct Dyes DB86, DB87, DB199, Acid Blue Dyes, such as AB185 and AB249, and cationic phthalocyanine dyes, such as Basic Blue 140. For example, Direct Blue 199, which is a tetrasulfonated copper phthalocyanine dye, can be adsorbed on the surface of copper phthalocyanine pigment.

In one embodiment, the ionic polymer comprises at least one monomer having an ionic or ionizable group and mixtures thereof. The resulting polymer can be either polyanionic or polycationic and is present in an amount such that in the composite, a total charge of the polymer is greater than that of the total charge of the at least one ionic synergist. In one embodiment, the at least one polymer coating the pigment surface also interacts with the at least one synergist. In one embodiment, the interaction takes the form of an ionic interaction (e.g., ionic bonding). Such ionic bonding can occur when the polymer has a charge opposing that of the synergist. In one embodiment, the interaction between the polymer and the pigment comprises ionic bonding and is further enhanced by one or more of Van der Waals interactions, hydrogen bonding, and acid/base interactions/reactions.

In one embodiment, by providing a composite having the polymer with a total charge greater than that of the total charge of the at least one synergist, this allows the polymer to have sufficient charge to interact with the synergist adsorbed on the surface and sufficient excess charge to render the composite pigment self-dispersible in a liquid vehicle, e.g., an aqueous vehicle.

In one embodiment, the polymer comprises one or monomers having acid groups (e.g., carboxylic acid) and salts thereof. In one embodiment, the polymer has an acid number of at least 20, or at least 50. In one embodiment, the polymer is selected from acrylate-based polymers having an acid number of at least 50. In another embodiment, the polymer is selected from polyurethanes having an acid number of at least 20. In one embodiment, the polymer is selected from polyelectrolytes and dispersants.

In one embodiment, the polymer coating encapsulates the pigment. In another embodiment, the coating partially covers the pigment, e.g., discontinuous phase(s). Analytical techniques can be used to measure particle charge to determine if a sufficient amount of polymer has been added to form a desired coating. Examples of such measurements are included in U.S. Pat. No. 6,641,656, which is incorporated herein by reference. For example, the zeta potential of the pigment and/or the pigment/synergist combination may be measured. As the ionic polymer is added to the pigment or pigment/synergist having a known or previously determined zeta potential, a change in surface charge would be expected because the added polymer has a charge opposite that of the synergist. Other methods of determining how much polymer to add may also be used.

In one embodiment, the amount of synergist ranges from 0.5% to 50% by weight relative to the total weight of the pigment, e.g., from 0.5% to 30%, from 0.5% to 20%, from 0.5% to 15%, from 0.5% to 10%, from 1% to 50%, from 1% to 30%, from 1% to 20%, from 1% to 15%, from 1% to 10%, from 2% to 50%, from 2% to 30%, from 2% to 20%, from 2% to 15%, or from 2.0% to 10% by weight relative to the total weight of the pigment. In one embodiment, the amount of synergist ranges from 1% to 30%, or from 2% to 15% by weight relative to the total weight of the pigment.

In one embodiment, the polymer is present in an amount ranging from 1% to 500% by weight relative to the total weight of the pigment, e.g., from 1% to 300%, from 1% to 200%, from 1% to 100%, from 5% to 500%, from 5% to 300%, from 5% to 200%, from 5% to 100%, from 10% to 500%, from 10% to 300%, from 10% to 200%, from 10% to 100%, from 15% to 500%, from 15% to 300%, from 15% to 200%, from 15% to 100%, by weight relative to the weight of the pigment. In one embodiment, the polymer is present in an amount ranging from 5% to 300%, from 10% to 200%, or from 15% to 100% by weight relative to the total weight of the pigment.

One embodiment provides a dispersion comprising the composite particles described herein. The amount of each component if the composite can be varied, depending on the desired properties (e.g., inks containing the dispersions and/or resulting printed image). In one embodiment, the amount of pigment ranges from 0.1% to 30%, relative to the total weight of the dispersion (or other amounts disclosed herein). In one embodiment, in a dispersion, the weight ratio of synergist/pigment ranges from 0.01 to 0.5. In another embodiment, in a dispersion the weight ratio of polymer/pigment ranges from 0.01 to 3.

In one embodiment, the composite particles have a mean particle size suitable for inkjet ink printing, e.g., sufficient for good jetting properties while providing suitable optical densities. In one embodiment, the composite particles have a mean particle size ranging from 50 nm to 600 nm, e.g., from 50 nm to 500 nm, from 50 nm to 400 nm, from 50 nm to 300 nm, or from 50 nm to 200 nm.

In one embodiment, the composite pigment disclosed herein provides sufficiently stable pigment dispersions. In one embodiment, wherein upon aging at 60° C. for 7 days, the mean particle size of the composite particles increases by no more than 200% or no more than 100% of the initial mean particle size, e.g., no more than 75% of the initial mean particle size, or no more than 50% of the initial mean particle size. In another embodiment, wherein upon aging at 60° C. for 7 days, the viscosity of the dispersion increases by no more than 100% of the initial viscosity, e.g., no more than 75% of the initial viscosity, or no more than 50% of the initial viscosity. "Initial" mean particle size or viscosity refers to the particle size or viscosity measured within 24 h of preparing the composite particle and stored at room temperature.

In one embodiment, the at least one ionic polymer coating the pigment surface is achieved by combining the pigment with the polymer itself, as opposed to combining the pigment with monomers that are subsequently polymerized. As a result, the polymerization can be achieved without interference from the pigment. This can also allow modification of the pigment/polymer separately prior to combination of the pigment with the polymer. In another embodiment, the at least one ionic polymer coating the pigment surface can be achieved by combining the pigment/synergist system with monomers that are subsequently polymerized.

One embodiment provides a method of making composite particles comprising:
combining a pigment with at least one ionic synergist adsorbed to the pigment surface;
coating the pigment surface comprising the at least one synergist with at least one ionic polymer,
wherein the at least one synergist and the at least one polymer have opposing charges, and
wherein in the composite, a total charge of the at least one polymer is greater than a total charge of the at least one synergist.

The pigment having at least one ionic synergist adsorbed on its surface can be prepared by any method known in the art, e.g., by combining the at least one synergist and pigment with the aid of mixing, blending, stirring, homogenizing, dispersing, etc. The pigment can then be combined with the polymer by similar methods or other methods known in the art. The combining can be performed as a batch or continuous process. In one embodiment, the pigment and ionic synergist(s) can be combined via high shear mixing to break the pigment agglomerates. In addition, various processes can be introduced during the preparation of pigment composites to remove unwanted materials. For example, dialfiltration or dialysis can be used to remove unwanted impurities (e.g., free synergists) after mixing (e.g., high-shear mixing) of pigment and synergists. In one embodiment, the pigment and charged synergist are first combined via high shear mixing to break the pigment agglomerates, followed by addition of oppositely-charged polymers with additional high shear mixing. In addition, various processes can be introduced during the preparation of pigment composites to remove unwanted materials. For example, dialfiltration or dialysis can be used to remove free synergists after mixing (e.g., high-shear mixing) of pigment and synergists, or pigment/synergist and polymers. The coating of the pigment surface comprising the at least one synergist with at least one ionic polymer can be performed by any method known in the art. In one embodiment, the coating is performed by high shear mixing.

Pigments

In one embodiment, the pigment is an organic pigment, e.g., an organic colored pigment. The colored pigment can be blue, brown, cyan, green, violet, magenta, red, or yellow, as well as mixtures thereof. Suitable classes of colored pigments include, for example, anthraquinones, phthalocyanine blues, phthalocyanine greens, diazos, monoazos, pyranthrones, perylenes, heterocyclic yellows, quinacridones, quinolonoquinolones, and (thio)indigoids. Such pigments are commercially available in either powder or press cake form from a number of sources including, BASF Corporation, Engelhard Corporation, Sun Chemical Corporation, Clariant, and Dianippon Ink and Chemicals (DIC). In one embodiment, the pigment has no primary amines.

Examples of phthalocyanine blues include copper phthalocyanine blue and derivatives thereof (Pigment Blue 15), such as PB15, PB15:1, PB15:2, PB15:3, PB15:4, PB15:5, PB15:6, PB16, PB17, PB17:1, PB68, PB70, PB75, PB76, PB79 and PG7, PG13, PG36, PG37, PG48, PG58, which are commercially available from suppliers such as BASF Corporation, Sun Chemical Corporation, Clariant International Ltd., DIC Corporation, and others. Examples of quinacridones include Pigment Orange 48, Pigment Orange 49, Pigment Red 122, Pigment Red 192, Pigment Red 202, Pigment Red 206, Pigment Red 207, Pigment Red 209, Pigment Violet 19 and Pigment Violet 42. Examples of anthraquinones include Pigment Red 43, Pigment Red 194 (Perinone Red), Pigment Red 216 (Brominated Pyrathrone Red) and Pigment Red 226 (Pyranthrone Red). Examples of perylenes include Pigment Red 123 (Vermillion), Pigment Red 149 (Scarlet), Pigment Red 179 (Maroon), Pigment Red 190 (Red), Pigment Violet, Pigment Red 189 (Yellow Shade Red) and Pigment Red 224. Examples of thioindigoids include Pigment Red 86, Pigment Red 87, Pigment Red 88, Pigment Red 181, Pigment Red 198, Pigment Violet 36, and Pigment Violet 38. Examples of heterocyclic yellow include Pigment Yellow 117 and Pigment Yellow 138. Examples of Group I Naphthol AS pigments include Pigment Red 8, Pigment Red 12, Pigment Red 13, Pigment Red 14, Pigment Red 15, Pigment Red 17, Pigment Red 22, and Pigment Red 23. Other suitable examples of pigments include yellow pigments such as Pigment Yellow 1, 74, 128, 139, 155, 180, 185, 213, 218, 220, and 221, red pigments such as Pigment Red 177, 185, 254, and 269, blue pigments such as Pigment Blue 16 and 60, orange pigments such as Pigment Orange 168, and green pigments such as Pigment Green 7 and 36. Examples of other suitable colored pigments are described in Colour Index, 3rd edition (The Society of Dyers and Cikiyrusts, 1982).

In one embodiment, the pigments are selected from azo pigments and the synergist is an azo compound that is a reaction product of an azo coupling of an aromatic or heterocyclic amine, containing ionizable group(s) with the same azo coupler that is used in preparation of the azo pigment. Optionally, the aromatic or heterocyclic amine may have other non-ionizable substituents to achieve a sufficient degree of structural similarity with the parent pigment. For phthalocyanines or polycyclic pigments, such as diketopyrrolopyrrole (DPP) or perylenes, the synergists may be prepared, for example, by simple electrophilic substitution of the pigment, e.g., sulfonation to achieve an anionic synergist or chlorosulfonation followed by amidation with a polyfunctional amine to achieve a cationic synergist.

In one embodiment, the synergist and/or pigment has at least one attached organic group. The organic group may be an aliphatic group, a cyclic organic group, or an organic compound having an aliphatic portion and a cyclic portion. In one embodiment, the organic group is attached via a diazonium salt derived from a primary amine capable of forming, even transiently, a diazonium salt. The organic group may be substituted (e.g., with at least one ionic group, ionizable group, or mixtures thereof) or unsubstituted, branched or unbranched. Aliphatic groups include, for example, groups derived from alkanes, alkenes, alcohols, ethers, aldehydes, ketones, carboxylic acids, and carbohydrates. Cyclic organic groups include, but are not limited to, alicyclic hydrocarbon groups (for example, cycloalkyls, cycloalkenyls), heterocyclic hydrocarbon groups (for example, pyrrolidinyl, pyrrolinyl, piperidinyl, morpholinyl, and the like), aryl groups (for example, phenyl, naphthyl, anthracenyl), and heteroaryl groups (imidazolyl, pyrazolyl, pyridinyl, thienyl, thiazolyl, furyl, indolyl, and triazolyl, such as 1,2,4-triazolyl and 1,2,3-triazolyl).

In one embodiment, the at least one attached organic group comprises at least one ionic group, ionizable group, or mixtures of an ionic group and an ionizable group, as described herein.

In one embodiment, the at least one organic group is capable of binding calcium (e.g., having defined calcium index values), including those organic groups described in PCT Pub. No. WO 2007/053564, the disclosure of which is incorporated herein by reference. For example, the organic group comprises at least one geminal bisphosphonic acid group, partial esters thereof, or salts thereof, e.g., a group having the formula —$CQ(PO_3H_2)_2$, partial esters thereof, or salts thereof, wherein Q is bonded to the geminal position and may be H, R, OR, SR, or N $R_2$ wherein R", which can be the same or different, is defined as above, or can be H, a $C_1$-$C_{18}$ saturated or unsaturated, branched or unbranched alkyl group, a $C_1$-$C_{18}$ saturated or unsaturated, branched or unbranched acyl group, an aralkyl group, an alkaryl group, or an aryl group. In addition, U.S. Pat. Nos. 5,672,198, 5,922,118, 6,042,643, and 6,641,656 disclose modified pigments having various attached groups, including phosphonic acid groups, the disclosures of which are incorporated herein by reference.

In one embodiment, the synergist or pigment is modified with at least one organic group via a diazonium treatment as detailed, for instance, in the following patents: U.S. Pat. Nos. 5,554,739; 5,630,868; 5,672,198; 5,707,432; 5,851,280; 5,885,335; 5,895,522; 5,900,029; 5,922,118; 6,042,643; 6,534,569; 6,398,858 and 6,494,943 (high shear conditions) 6,372,820; 6,368,239; 6,350,519; 6,337,358; 6,103,380; 7,173,078; 7,056,962; 6,942,724; 6,929,889; 6,911,073; 6,478,863; 6,472,471; and WO 2011/143533, the disclosures of which are incorporated herein by reference. In one embodiment, the attachment is provided via a diazonium reaction where the at least one organic group has a diazonium salt substituent. In another embodiment, the direct attachment can be formed by using the diazonium and stable free radical methods described, for instance, in U.S. Pat. Nos. 6,068,688; 6,337,358; 6,368,239; 6,551,393; 6,852,158, the disclosures of which are incorporated herein by reference, which makes use of reacting at least one radical with at least one particle, wherein a radical is generated from the interaction of at least one transition metal compound with at least one organo-halide compound in the presence of one or more particles capable of radical capture, and the like.

The amount of attached organic groups can be varied, depending on the desired use of the modified pigment and the type of attached group. For example, the total amount of organic group may be from 0.01 to 10.0 micromoles of groups/$m^2$ surface area of pigment, as measured by nitrogen adsorption (BET method), including from 0.5 to 5.0 micromoles/$m^2$, from 1 to 3 micromoles/$m^2$, or from 2 to 2.5 micromoles/$m^2$.

Polymers

The polymer may be a natural polymer or a synthetic polymer having a charge or capable of being charged, i.e., having at least one ionic or ionizable group and mixtures thereof. The polymer can be selected from polyelectrolytes and/or dispersants. Examples of natural polymers include proteins such as glue, gelatin, casein and albumin; natural rubbers such as gum arabic and tragacanth gum; glucosides such as saponin; alginic acid, and alginic acid derivatives such as propyleneglycol alginate, triethanolamine alginate, and ammonium alginate; and carbohydrates including cellulose derivatives such as methyl cellulose, carboxymethyl cellulose, hydroxyethyl cellulose and ethylhydroxy cellulose. Examples of synthetic polymers include polyvinyl alcohols; polyvinylpyrrolidones; acrylate-based polymers, e.g., acrylic or methacrylic resins and copolymers thereof (often written as "(meth)acrylic"), poly(meth)acrylic acid, acrylic acid-(meth)acrylonitrile copolymers, potassium (meth)acrylate-(meth)acrylonitrile copolymers, vinyl acetate-(meth)acrylate ester copolymers and (meth)acrylic acid-(meth)acrylate ester copolymers, styrene-acrylic or methacrylic resins such as styrene-(meth)acrylic acid copolymers, styrene-(meth)acrylic acid-(meth)acrylate ester copolymers, styrene-α-methylstyrene-(meth)acrylic acid copolymers, styrene-α-methylstyrene-(meth)acrylic acid-(meth)acrylate ester copolymers, and styrene-maleic acid copolymers; styrene-maleic anhydride copolymers, vinyl naphthalene-acrylic or methacrylic acid copolymers; vinyl naphthalene-maleic acid copolymers; and vinyl acetate copolymers such as vinyl acetate-ethylene copolymer, vinyl acetate-fatty acid vinyl ethylene copolymers, vinyl acetate-maleate ester copolymers, vinyl acetate-crotonic acid copolymer and vinyl acetate-acrylic acid copolymer; and salts thereof. Other polymers include polyesters with charged groups such as sulfonates, and polyurethanes with charged groups, such as carboxylates, polyphenols and polyphenolates. The ionic polymers may also include linear or branched polyamines such as polyethyleneimine (PEI), oligomers of ethyleneimine (such as pentaethyleneamine, PEA), derivatives of polyethyleneimine, and amino acrylate polymers (such as dimethylaminoethyl methacrylate or acrylate homo- or copolymers), PAMAMs or other quaternary amine polymers, and polyallyl amines.

In one embodiment, the polymer is linear or branched. In one embodiment, the branched polymer has the shape of star, comb, or brush. In one embodiment, the polymer can be a random copolymer or block copolymer.

In one embodiment, the polymer is anionic and is selected from acrylate-based polymers, polyurethanes, and polyesters.

Dispersions and Inkjet Ink Compositions

One embodiment provides a dispersion comprising the pigment composites described herein and a liquid vehicle. The dispersion can be prepared by using any method known in the art. For example, the modified pigment in a dry form may be combined with the liquid vehicle with agitation to produce a stable dispersion. Any equipment known in the art, such as a media or ball mill, or high shear mixing equipment can be used, and various conventional milling media may also be used. The dispersion can be prepared by adding pigments and polymers with opposite charges via any method known in the art. In one embodiment, the pigment is subjected to high shear mixing to break the pigment agglomerates, followed by or concurrent with the addition of oppositely-charged polymers with additional high shear mixing. Subsequent processes include sonication, diafiltration, and/or centrifugation. In addition, various processes can be introduced during the preparation of pigment composites to remove unwanted materials, such as, for example, dialfiltration or dialysis. Other methods for forming the dispersion will be known to one skilled in the art.

The liquid vehicle can be an aqueous or non-aqueous vehicle. In one embodiment, the vehicle contains water, e.g., the vehicle comprises an aqueous solution. In one embodiment, the aqueous solution contains greater than 50% by weight water and can be, for example, water or mixtures of water with water miscible solvents such as alcohols. In one embodiment, the amount of pigment without the polymer coating present in the dispersion can be varied but is typically in an amount ranging from 0.1% to 40%, e.g., from 1% to 40%, from 1% to 30%, from 1% to 25%, from 1% to 20%, from 1% to 15%, from 2% to 40%, from 2% to 30%, from 2% to 25%, from 2% to 20%, from 2% to 15%, from 3% to 40%, from 3% to 30%, from 3% to 25%, from 3% to 20%, or from 3% to 15%, based on the total weight of the dispersion.

In one embodiment, in a dispersion the weight ratio of synergist/pigment ranges from 0.01 to 0.5. In another embodiment, in a dispersion the weight ratio of polymer/pigment ranges from 0.01 to 3.

In one embodiment, the dispersion has a total solids content ranging from 10% to 40% by weight, relative to the total weight of the pigment, e.g., from 10% to 35%, from 10% to 30%, from 10% to 25%, from 10% to 20%, from 15% to 40%, from 15% to 35%, from 15% to 30%, from 15% to 25%, or from 15% to 20% by weight, relative to the total weight of the pigment.

In one embodiment, the dispersions disclosed herein are stable, as indicated by properties that do not change by more than 20% upon heat aging for 6 weeks at 60° C. Such properties include particle size (e.g., mean volume, mV, as measured by Nanotrac), or viscosity. In another embodiment, the properties such as particle size and viscosity, do not change by more than 10% upon heat aging for 6 weeks at 60° C.

Another embodiment provides inkjet ink compositions comprising the dispersions disclosed herein. The amount of modified pigment used in the inkjet ink composition can be varied but is typically in an amount effective to provide the desired image quality (for example, optical density) without detrimentally affecting the performance of the inkjet ink. In one embodiment, the pigments disclosed herein are present in the inkjet ink composition in an amount ranging from 0.1% to 20%, e.g., from 1% to 20%, from 1% to 10%, or from 3% to 8%, based on the total weight of the inkjet ink composition.

The inkjet ink composition can be formed with a minimum of additional components (additives and/or cosolvents) and processing steps. However, suitable additives may also be incorporated into these inkjet ink compositions to impart a number of desired properties while maintaining the stability of the compositions. For example, surfactants may be added to further enhance the colloidal stability of the composition. Other additives are well known in the art and include humectants, biocides and fungicides, binders such as polymeric binders, pH control agents, drying accelerators, penetrants, and the like. The amount of a particular additive will vary depending on a variety of factors but are generally present in an amount ranging between 0% and 40% based on the weight of the inkjet ink composition.

Dispersing agents (surfactants and/or dispersants) may be added to further enhance the colloidal stability of the composition or to change the interaction of the ink with either the printing substrate, such as printing paper, or with the ink printhead. Various anionic, cationic and nonionic dispersing agents can be used in conjunction with the ink composition of the present invention, and these may be used neat or as a water solution. The dispersing agent may be present in the inkjet ink composition in an amount ranging from 0.1% to 5%.

Representative examples of anionic dispersants or surfactants include, but are not limited to, higher fatty acid salts, higher alkyldicarboxylates, sulfuric acid ester salts of higher alcohols, higher alkyl-sulfonates, alkylbenzenesulfonates, alkylnaphthalene sulfonates, naphthalene sulfonates (Na, K, Li, Ca, etc.), formalin polycondensates, condensates between higher fatty acids and amino acids, dialkylsulfosuccinic acid ester salts, alkylsulfosuccinates, naphthenates, alkylether carboxylates, acylated peptides, α-olefin sulfonates, N-acrylmethyl taurine, alkylether sulfonates, secondary higher alcohol ethoxysulfates, polyoxyethylene alkylphenylether sulfates, monoglycylsulfates, alkylether phosphates and alkyl phosphates, alkyl phosphonates and bisphosphonates, included hydroxylated or aminated derivatives. For example, polymers and copolymers of styrene sulfonate salts, unsubstituted and substituted naphthalene sulfonate salts (e.g. alkyl or alkoxy substituted naphthalene derivatives), aldehyde derivatives (such as unsubstituted alkyl aldehyde derivatives including formaldehyde, acetaldehyde, propylaldehyde, and the like), maleic acid salts, and mixtures thereof may be used as the anionic dispersing aids. Salts include, for example, $Na^+$, $Li^+$, $K^+$, $Cs^+$, $Rb^+$, and substituted and unsubstituted ammonium cations. Representative examples of cationic surfactants include aliphatic amines, quaternary ammonium salts, sulfonium salts, phosphonium salts and the like.

Representative examples of nonionic dispersants or surfactants that can be used in ink jet inks include fluorine derivatives, silicone derivatives, acrylic acid copolymers, polyoxyethylene alkyl ether, polyoxyethylene alkylphenyl ether, polyoxyethylene secondary alcohol ether, polyoxyethylene styrol ether, ethoxylated acetylenic diols, polyoxyethylene lanolin derivatives, ethylene oxide derivatives of alkylphenol formalin condensates, polyoxyethylene polyoxypropylene block polymers, fatty acid esters of polyoxyethylene polyoxypropylene alkylether polyoxyethylene compounds, ethylene glycol fatty acid esters of polyethylene oxide condensation type, fatty acid monoglycerides, fatty acid esters of polyglycerol, fatty acid esters of propylene glycol, cane sugar fatty acid esters, fatty acid alkanol amides, polyoxyethylene fatty acid amides and polyoxyethylene alkylamine oxides. For example, ethoxylated monoalkyl or dialkyl phenols may be used. These nonionic surfactants or dispersants can be used alone or in combination with the aforementioned anionic and cationic dispersants.

The dispersing agents may also be a natural polymer or a synthetic polymer dispersant. Specific examples of natural polymer dispersants include proteins such as glue, gelatin, casein and albumin; natural rubbers such as gum arabic and tragacanth gum; glucosides such as saponin; alginic acid, and alginic acid derivatives such as propyleneglycol alginate, triethanolamine alginate, and ammonium alginate; and cellulose derivatives such as methyl cellulose, carboxymethyl cellulose, hydroxyethyl cellulose and ethylhydroxy cellulose. Specific examples of polymeric dispersants, including synthetic polymeric dispersants, include polyvinyl alcohols, polyvinylpyrrolidones, acrylic or methacrylic resins (often written as "(meth)acrylic") such as poly(meth) acrylic acid, acrylic acid-(meth)acrylonitrile copolymers, potassium (meth)acrylate-(meth)acrylonitrile copolymers, vinyl acetate-(meth)acrylate ester copolymers and (meth) acrylic acid-(meth)acrylate ester copolymers; styrene-acrylic or methacrylic resins such as styrene-(meth)acrylic acid copolymers, styrene-(meth)acrylic acid-(meth)acrylate ester copolymers, styrene-α-methylstyrene-(meth)acrylic acid copolymers, styrene-α-methylstyrene-(meth)acrylic acid-(meth)acrylate ester copolymers; styrene-maleic acid copolymers; styrene-maleic anhydride copolymers, vinyl naphthalene-acrylic or methacrylic acid copolymers; vinyl naphthalene-maleic acid copolymers; and vinyl acetate copolymers such as vinyl acetate-ethylene copolymer, vinyl acetate-fatty acid vinyl ethylene copolymers, vinyl acetate-maleate ester copolymers, vinyl acetate-crotonic acid copolymer and vinyl acetate-acrylic acid copolymer; and salts thereof.

Additionally, the inkjet ink compositions may further incorporate dyes to modify color balance and adjust optical density. Such dyes include food dyes, FD&C dyes, acid dyes, direct dyes, reactive dyes, derivatives of phthalocyanine sulfonic acids, including copper phthalocyanine derivatives, sodium salts, ammonium salts, potassium salts, and lithium salts.

EXAMPLES

The following examples describe the preparation of aqueous pigment dispersions that are first dispersed by cationic synergists, and then become anionic pigment dispersions by adding anionic polymeric dispersants. These pigment dispersions demonstrate improved properties over comparative examples, which include anionic polymer-dispersed pigment dispersion, anionic synergist-dispersed pigment dispersion, and pigment dispersion first dispersed by conventional cationic surfactants and followed by addition of anionic polymeric dispersants.

Example 1

This Example describes the synthesis of a synergist ("Cationic Synergist I"). A synthetic scheme is depicted below.

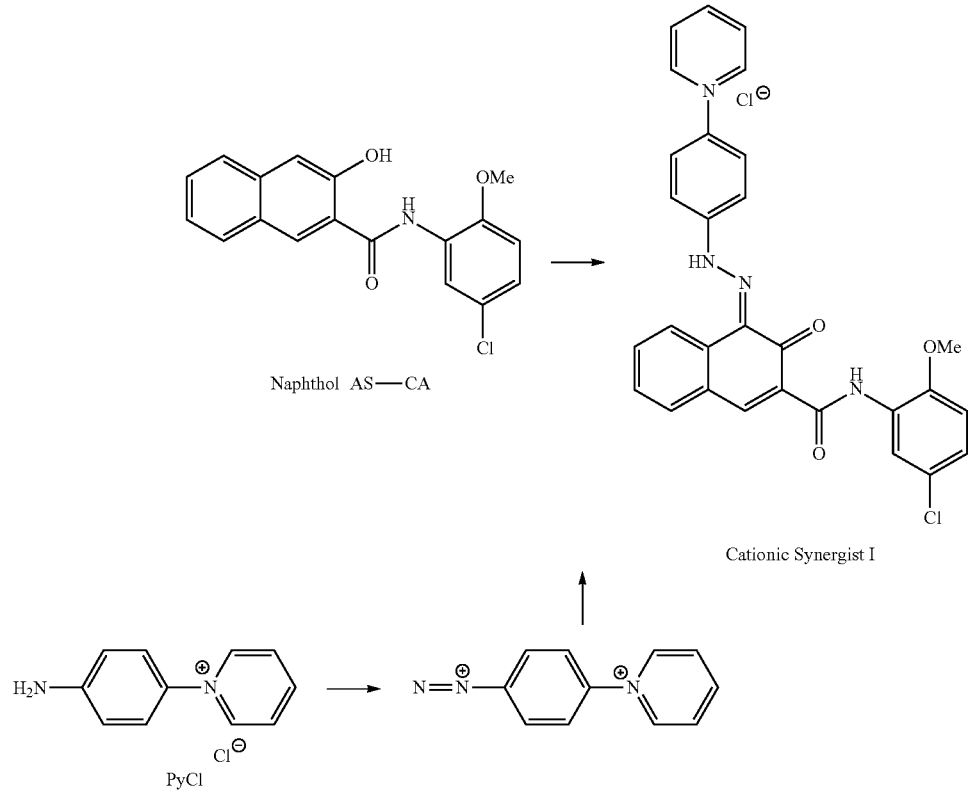

To a 250 mL Erlenmeyer flask were added 14.6 g of 1-(4-aminophenyl)pyridine-1-ium chloride ("PyCl"), 20 g deionized ice water, and 80 g of deionized water under stirring. After all PyCl solids were dissolved, 40 mL of 2M sodium nitrite was added to this solution, which was then put into an ice-water bath and cooled to <5° C. To a separate 500 mL Erlenmeyer flask submerged in an ice water bath were added 50 mL deionized ice water and 200 mL of 1M HCl solution. The amine in the PyCl solution prepared above was diazotized by dropwise addition of the cold HCl solution. Excess nitrous acid was destroyed by addition of approximately 2 g of sulfamic acid. This diazo-PyCl solution was kept in an ice-water bath until used for the coupling reaction.

In a separate 2L vessel, 22.89 g of N-(5-chloro-2-methoxyphenyl)-3-hydroxy-2-naphthamide (available from TCl as Naphthol AS-CA) was dissolved in a solution 37.5 mL of 2M NaOH and 250 ml of ethanol. The resulting solution was cooled to 5° C. To this solution was added the diazo-PyCl solution dropwise with vigorous stirring over a time period of 40 min to 1 hour. Since the solution became very viscous during the addition period, another 200 mL of ethanol and 300 mL of methanol were added to ensure a good mixing. During the whole addition period, approximately 50 mL of 2M NaOH was added to the reaction mixture to maintain a pH >12. The reaction mixture was allowed to warm back to room temperature gradually and then stirred at room temperature overnight. The resulting red precipitate was removed by filtration, washed with deionized water, and dried in the vacuum oven at 60° C. to yield 32.4 g of the Cationic Synergist I.

Example 2

This Example describes the preparation of a composite comprising a pigment, synergist, and polymer having a charge opposite and greater than that of the synergist. The polymer used in this Example is Joncryl® 683, a styrene-acrylic acid copolymer available from BASF having an acid number of 165 and a MW of 7000-9000.

The Cationic Synergist I prepared in Example 1 (3.3 g) was combined with 73.3 g of Pigment Red 269 (presscake with 46.4% solid; available from Sun Chemical Corporation, Cincinnati, Ohio) and 128 g of deionized water. This mixture was sonicated at approximately 10° C. with a Misonix® probe sonicator for 1 hour to afford a low viscosity, red dispersion with a mean particle size of about 255 nm (determined by using a Microtrac® Particle Size Analyzer). To this PR269 dispersion was added 30.1 g of Joncryl® 683 polymer solution (7.65 g of Joncryl® 683 and 1.25 g of KOH in 21.2 g of deionized water) under fast stirring. Over the course of adding the Joncryl® 683 polymer solution, the viscosity of the dispersion increased to a gel-like form and then reverted back to a final, low viscosity mixture. Presumably the viscosity resulted from changes in the surface charges of the PR269 dispersion from initially cationic to a final anionic charge. The mixture was then allowed to stir for 5 minutes, resulting in particles having a mean particle size of about 244 nm. The dispersion was sonicated at about 10° C. for another hour to afford a red dispersion having a mean particle size of about 163 nm. The resulting dispersion was centrifuged at 2,500 G for about 30 minutes and then decanted to isolate the product. A final aqueous dispersion (320 g) of Joncryl® 683/Cationic Synergist I-dispersed PR269 with 12.6% solid was obtained. Table 1 below lists the final particle size distribution Example 3

The Cationic Synergist I prepared in Example 1 (3.3 g) was combined with 73.3 g of Pigment Red 269 (presscake with 46.4% solid; available from Sun Chemical Corporation, Cincinnati, Ohio) and 128 g of deionized water. This mixture was sonicated at approximately 10° C. using a Misonix® probe sonicator for 1 hour to afford a low viscosity, red dispersion with a mean particle size of about 180 nm. To this PR269 dispersion was added 40 g of Joncryl® 683 polymer solution (5.1 g of Joncryl® 683 and 0.84 g of KOH in 34.06 g of deionized water) under fast stirring. Over the course of adding the Joncryl® 683 polymer solution, the viscosity of the dispersion increased to a gel-like form and then reverted back to a final, low viscosity mixture. Presumably the viscosity resulted from changes in the surface charges of the PR269 dispersion from initially cationic to a final anionic charge. The mixture was then allowed to stir for 5 minutes, resulting in particles having a mean particle size of about 200 nm. The dispersion was sonicated at about 10° C. for another hour. The resulting dispersion was centrifuged at 2,500 G for about 30 minutes and then decanted to isolate the product. A final aqueous dispersion (270 g) of Joncryl 683®/Cationic Synergist I-dispersed PR269 with 15% solid was obtained (see Table 1 for particle size distribution).

Comparative Example A

This Example describes the preparation of a pigment/polymer dispersion without a synergist. 29.5 g of Joncryl® 683 polymer solution (7.5 g of Joncryl® 683 and 1.24 g of KOH in 20.76 g of deionized water) was combined with 86.2 g of Pigment Red 269 (presscake with 46.4% solid; available from Sun Chemical Corporation, Cincinnati, Ohio) and 126 g of deionized water and sonicated at about 10° C. using a Misonix® probe sonicator for 1 hour to afford a red dispersion with a mean particle size of about 165 nm. After sonicating this dispersion sonicated for another hour, the resulting dispersion was centrifuged at 2,500 G for about 30 minutes and then decanted to isolate the product. A final aqueous dispersion (240 g) of Joncryl® 683-dispersed PR269 with 18.9% solid was obtained (see Table 1 for particle size distribution). For this dispersion, the viscosity remained low and the surface charge remained anionic over the entire period.

Comparative Example B

This Example describes the preparation of a pigment/synergist dispersion without a polymer. Anionic PR269 Synergist I, depicted below, can be prepared, for example, by using the procedure described in U.S. Pat. No. 7,223,302 B2.

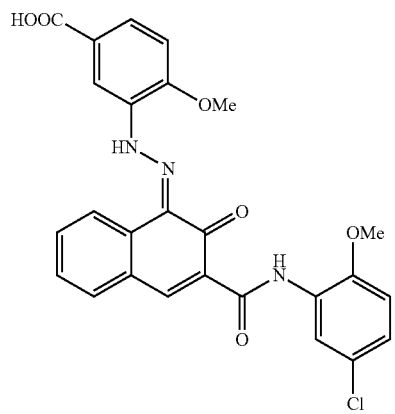

PR269 Synergist I

PR269 Synergist I (3.2 g) was combined with 0.91 g of 45% KOH solution, 69 g of Pigment Red 269 (presscake with 46.4% solid; available from Sun Chemical Corporation, Cincinnati, Ohio), and 162 g of deionized water. This mixture was sonicated at approximately 10° C. using a Misonix® probe sonicator for 1 hour to afford a red dispersion with a mean particle size of about 158 nm. This dispersion was then sonicated for another hour. The resulting dispersion was centrifuged at 2,500 G for about 30 minutes and then decanted to isolate the product. A final aqueous dispersion (220 g) of synergist-dispersed PR269 with 15.2% solid was obtained (see Table 1 for particle size distribution). For this dispersion, the viscosity was low and the surface charges remained anionic over the entire period.

Comparative Example C

This Example describes the preparation of a pigment/cationic surfactant dispersion further combined with an anionic polymer, in which the cationic surfactant is not a synergist. The cationic surfactant cetyltrimethylammonium bromide (CTAB, 1.33 g) was combine with 69 g of Pigment Red 269 (presscake with 46.4% solid; available from Sun Chemical Corporation, Cincinnati, Ohio) and 138 g of deionized water and sonicated at about 10° C. using a Misonix® probe sonicator for 1 h to afford a low viscosity, red dispersion with a mean particle size of about 154 nm. To this PR269 dispersion was added 45.8 g of Joncryl® 683 polymer solution (6.0 g of Joncryl® 683 and 0.99 g of KOH in 38.8 g of deionized water) under fast stirring. Over the course of adding the Joncryl® 683 polymer solution, the viscosity of the dispersion increased to a gel-like form and then reverted back to a final, low viscosity mixture. Presumably the viscosity resulted from changes in the surface charges of the PR269 dispersion from initially cationic to a final anionic charge. After addition was over, the mixture was allowed to stir for 5 minutes resulting in particles having a mean particle size was about 203 nm. The dispersion was sonicated at about 10° C. for another hour to afford a red dispersion with a mean particle size of about 145 nm. The resulting dispersion was centrifuged at 2,500 G for about 30 minutes and then decanted to isolate the product. A final aqueous dispersion (260 g) of Joncryl® 683/CTAB-dispersed PR269 with 14.1% solid was obtained (see Table 1 for particle size distribution).

TABLE 1

| Samples | Dispersant composition for Pigment Red 269 | % solid | pH | Mean particle size (nm) | $D_{100}$ particle size (nm) |
|---|---|---|---|---|---|
| Example 2 | Cationic synergist I and Joncryl® 683 | 12.6 | 8.76 | 155 | 486 |
| Example 3 | Cationic synergist I and Joncryl® 683 | 15.0 | 8.70 | 150 | 409 |
| Comparative Example A | Joncryl® 683 | 18.9 | 9.40 | 144 | 409 |
| Comparative Example B | PR269 Synergist I | 15.2 | 9.63 | 138 | 344 |
| Comparative Example C | Cationic CTAB and Joncryl® 683 | 14.1 | 8.45 | 145 | 409 |

Example 4

This Example describes the preparation of inkjet ink compositions and stability testing.

The aqueous dispersions of Examples 2 and 3 and Comparative Examples A-C were combined with the components of Table 2 to make ink compositions. For these five inks, their pH, particle size distribution (i.e., mean particle size and $D_{100}$ particle size), and viscosity were recorded immediately after ink preparation (time=initial) and after 1 week of heating in a 60° C. oven (time=week 1). The recorded ink physicals are listed in Table 3. $D_{100}$ was the largest particle size from the measurement, where 100 percent of the particle population lies below the $D_{100}$.

TABLE 2

| Ingredient | Amount (wt %) |
|---|---|
| Pigment | 4.5% |
| Glycerol | 40% |
| Surfynol 465* | 1.0% |
| Water | 54.5% |

*SURFYNOL® 465 is a non-ionic surfactant from Air Products

TABLE 3

| Samples | Time | pH | Mean particle size (nm) | 100% particle size (nm) | Viscosity (cP) |
|---|---|---|---|---|---|
| Example 2 | initial | 8.41 | 147 | 409 | 4.22 |
|  | week 1 | 8.26 | 179 | 687 | 6.22 |
| Example 3 | initial | 8.41 | 154 | 409 | 5.08 |
|  | week 1 | 8.05 | 196 | 578 | 7.22 |
| Comparative Example A | initial | 8.52 | 135 | 344 | 4.72 |
|  | week 1 | 8.42 | 451 | 1635 | 17.3 |
| Comparative Example B | initial | 8.69 | 133 | 344 | 4.94 |
|  | week 1 | 8.76 | 388 | 972 | 15.3 |
| Comparative Example C | initial | 8.08 | 140 | 409 | 4.26 |
|  | week 1 | 7.99 | 691 | 2750 | 14.3 |

As evident from the results shown in Table 3, the inkjet recording inks of the composite PR269 particles of Examples 2 and 3, in which the pigments are first dispersed by cationic synergists and then combined with anionic polymeric dispersants, exhibited excellent stability, i.e., small changes in particle size distribution (mean particle size) and viscosity after 1 week of heating. In contrast: (1) the inkjet recording ink of Comparative Example A, which comprise PR269 dispersions dispersed only by an anionic polymeric dispersant, became very unstable after 1 week of heating as evidenced by a >230% increase in mean particle size and a >260% jump in viscosity; (2) the inkjet recording ink of Comparative Example B, which comprise PR269 particles dispersed only by anionic synergists, became very unstable after 1 week of heating as evidenced by a >190% increase in mean particle size and a >210% jump in viscosity; (3) the inkjet recording ink of Comparative Example C, which comprise PR269 dispersions first dispersed by a cationic non-synergist surfactant (CTAB) and further combined with anionic polymeric dispersants, became very unstable after 1 week of heating, as evidenced by a >390% increase in mean particle size and a >230% jump in viscosity.

Example 5

This Example describes the preparation of a PB15:4 dispersion containing Basic Blue 140, having the structure below:

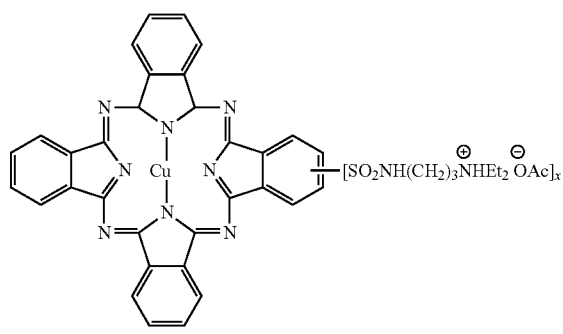

Basic Blue 140; x = 3-4

Pigment Blue 15:4 (32.4% presscake obtained from Sun Chemical) in the amount of 155.3 g (equivalent to 50 g of dry pigment) was mixed with 12.5 g of liquid Cartasol Turquoise KRL (Basic Blue 140, CAS#61724-62-7, Clariant Corporation; dye content of ~20%) and 183 ml of DI water. The mixture was homogenized using Silverson rotor-stator mixer LR4RT-A for 60 minutes and then sonicated for 60 minutes using Misonix batch sonicator at 183 W power. The dispersion was diafiltered through a 50 nm GE membrane until the conductivity reached 250 microsiemens and centrifuged at 2,500 g for 30 minutes. The resulting cationic dispersion had Mv of 100.9 nm (Nanotrac) and solids content of 13.2.

Example 6

This Example describes the preparation of a PB15:4 dispersion containing Direct Blue 86, having the structure below:

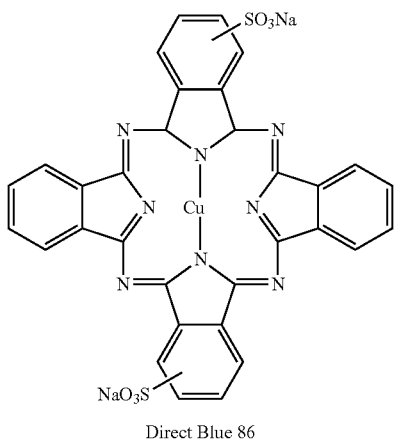

Direct Blue 86

Pigment Blue 15:4 (32.4% presscake obtained from Sun Chemical) in the amount of 155.3 g (equivalent to 50 g of dry pigment) was mixed with 4.5 g of Direct Blue 86 (TCI Chemicals, dye content 89%; the balance is sodium chloride and sodium sulphate; dye content is 4 g or 8% over the weight of pigment) and 200 ml of DI water. The mixture was homogenized using a Silverson rotor-stator mixer LR4RT-A for 60 minutes and then sonicated for 60 minutes using Misonix batch sonicator at 183 W power. The dispersion was diafiltered through a 50 nm GE membrane until the conductivity reached 250 microsiemens and centrifuged at 2,500 g for 30 minutes. The resulting anionic dispersion had Mv of 134.3 nm (Nanotrac), sodium counterion content of 3,454 ppm (dry basis) and solids content of 12.0%.

Example 7

This Example describes the preparation of a PB15:4 dispersion containing Direct Blue 199, which is a tetrasodium salt of tetrasulfonated copper phthalocyanine. The procedure of Example 6 was used with 16 g of Direct Blue 199 (Permalite FBL 400% from Standard Dyes; dye content is 60%; the balance is sodium chloride and sodium sulphate; pure dye content is 4 g or 8% over the weight of pigment). The resulting anionic dispersion had Mv of 126.8 nm (Nanotrac), sodium counterion content of 2,887 ppm (dry basis) and solids content of 10.9%.

Example 8

This Example describes the preparation of a PB15:4 dispersion containing Acid Blue 185, which is a trisodium salt of trisulfonated copper phthalocyanine. The procedure of Example 6 was used with 16 g of Acid Blue 185 (Permalon M5G from Standard Dyes; dye content is 60%; the balance is sodium chloride and sodium sulphate; pure dye content is 4 g or 8% over the weight of pigment). Obtained anionic dispersion had My of 123.4 nm (Nanotrac), sodium counterion content of 2,247 ppm (dry basis) and solids content of 13.2%.

Example 9

Heat Aging

Heat aging was performed on the dispersions as-is, and in a 4% solids aqueous mixture containing 10% triethyleneglycol monobutylether (TEGMBE). Materials were heat aged for 6 weeks at 60° C., and the particle size, viscosity and filterability (1 μm polypropylene syringe filter) at 1, 2, and 6 weeks were measured.

The physical properties of these samples after heat aging at 60° C. for 6 weeks are listed in Table 4. Table 4 also provides the % change in each property.

TABLE 4

| Example | Synergist | % mv change | % viscosity change | Filterability |
|---|---|---|---|---|
| 5 | Basic Blue 140 | 5 | 5 | PASS |
| 6 | Direct Blue 86 | −9 | 3 | PASS |
| 7 | Direct Blue 199 | −1 | 3 | PASS |
| 8 | Acid Blue 185 | −1 | −1 | PASS |
| 1 + TEGMBE | Basic Blue 140 | 7 | 7 | PASS |
| 2 + TEGMBE | Direct Blue 86 | −1 | 5 | PASS |
| 3 + TEGMBE | Direct Blue 199 | 7 | 7 | PASS |
| 4 + TEGMBE | Acid Blue 185 | 1 | 5 | PASS |

A change in physical properties of less than 20% indicates a stable dispersion. From Table 4, it can be seen that the physical property changes were well within acceptable limits (change of less than 10%) for each dispersion of Examples 5-8.

The use of the terms "a" and "an" and "the" are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the claimed invention and does not pose a limitation on the scope of the claimed invention unless otherwise claimed. No language in the specification should be construed as indicating any non-claimed element as essential to the practice of the claimed invention.

The invention claimed is:

1. An inkjet ink composition comprising:
   an aqueous vehicle; and
   composite particles comprising:
       a pigment selected from anthraquinones, phthalocyanine blues, phthalocyanine greens, diazos, monoazos, pyranthrones, perylenes, heterocyclic yellows, quinolonoquinolones, and (thio)indigoids;
       at least one ionic synergist adsorbed to the pigment surface; and
       at least one ionic polymer coating the pigment surface comprising the at least one synergist,
       wherein the at least one synergist and the at least one polymer have opposing charges,
       wherein in the composite, a total charge of the at least one polymer is greater than a total charge of the at least one synergist,
       wherein the composite particles have a mean particle size ranging from 50 nm to 600 nm, and
       wherein the synergist is structurally similar to the pigment with an identical structural section comprising at least 50% of the total molecular weight of the pigment.

2. The composition of claim 1, wherein the coating comprises the at least one polymer partially coating the pigment.

3. The composition of claim 1, wherein the coating comprises the at least one polymer encapsulating the pigment.

4. The composition of claim 1, wherein the at least one synergist is anionic and the at least one polymer is cationic.

5. The composition of claim 1, wherein the at least one synergist is cationic and the at least one polymer is anionic.

6. The composition claim 1, wherein the at least one ionic synergist is selected from salts of carboxylic acids, sulfonic acids, phosphonic acids, hydroxyls, and amines.

7. The composition claim 1, wherein the pigment is an organic pigment.

8. The composition of claim 1, wherein the at least one ionic polymer is selected from salts of carboxylic acids, sulfonic acids, phosphonic acids, hydroxyls, and amines.

9. The composition of claim 1, wherein the at least one polymer is anionic and is selected from acrylate-based polymers, polyurethanes, and polyesters.

10. The composition of claim 1 wherein the at least one polymer has an acid number of at least 20.

11. The composition of claim 10, wherein the at least one polymer is selected from polyurethanes.

12. The composition of claim 1, wherein the at least one polymer has an acid number of at least 50.

13. The composition of claim 12, wherein the at least one polymer is selected from acrylate-based polymers.

14. The composite particles composition of claim 1, wherein the weight ratio of synergist/pigment ranges from 0.01 to 0.5.

15. The composition of claim 1, wherein the at least one synergist is a derivative of the pigment.

16. The composition of claim 1, wherein the pigment and the at least one synergist are derivatives of the same chromophore.

17. The dispersion composition of claim 1, wherein upon aging at 60° C. for 7 days, the mean particle size of the composite particles increases by no more than 200% of the initial mean particle size.

18. The composition of claim 1, wherein upon aging at 60° C. for 7 days, the viscosity of the composition increases by no more than 100% of the initial viscosity.

19. The composition of claim 1, wherein the pigment is present in the dispersion in an amount ranging from 1% to 30% by weight, relative to the total weight of the dispersion.

20. A method of making a dispersion comprising an aqueous vehicle and composite particles comprising:
    combining a pigment dispersion comprising an aqueous vehicle with at least one ionic synergist adsorbed to the pigment surface, wherein the pigment is selected from anthraquinones, phthalocyanine blues, phthalocyanine greens, diazos, monoazos, pyranthrones, perylenes, heterocyclic yellows, quinolonoquinolones, and (thio)indigoids;
    coating the pigment surface comprising the at least one synergist with at least one ionic polymer,
    wherein the at least one synergist and the at least one polymer have opposing charges,
    wherein in the composite, a total charge of the at least one polymer is greater than a total charge of the at least one synergist,
    wherein the composite particles have a mean particle size ranging from 50 nm to 600 nm, and
    wherein the synergist is structurally similar to the pigment with an identical structural section comprising at least 50% of the total molecular weight of the pigment.

* * * * *

UNITED STATES PATENT AND TRADEMARK OFFICE
CERTIFICATE OF CORRECTION

PATENT NO.       : 10,030,160 B2
APPLICATION NO.  : 15/104355
DATED            : July 24, 2018
INVENTOR(S)      : Jinqi Xu et al.

It is certified that error appears in the above-identified patent and that said Letters Patent is hereby corrected as shown below:

In the Claims

At Column 22, Line 22, Claim 17, that portion reading "The dispersion composition of claim 1" should read --The composition of claim 1--.

Signed and Sealed this
Twenty-sixth Day of March, 2019

Andrei Iancu
*Director of the United States Patent and Trademark Office*